(12) United States Patent
Kaltenbach et al.

(10) Patent No.: US 8,959,275 B2
(45) Date of Patent: *Feb. 17, 2015

(54) BYTE SELECTION AND STEERING LOGIC FOR COMBINED BYTE SHIFT AND BYTE PERMUTE VECTOR UNIT

(71) Applicant: International Business Machines Corporation, Armonk, NY (US)

(72) Inventors: Markus Kaltenbach, Holzgerlingen (DE); Jens Leenstra, Bondorf (DE); Philipp Panitz, Laatzen (DE); Christoph Wandel, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 221 days.

This patent is subject to a terminal disclaimer.

(21) Appl. No.: 13/646,974

(22) Filed: Oct. 8, 2012

(65) Prior Publication Data

US 2014/0101358 A1    Apr. 10, 2014

(51) Int. Cl.
G06F 13/00 (2006.01)
G06F 7/00 (2006.01)
G06F 13/40 (2006.01)
H04L 12/933 (2013.01)

(52) U.S. Cl.
CPC .......... G06F 13/4022 (2013.01); H04L 49/101 (2013.01)
USPC ........................................................ 710/317

(58) Field of Classification Search
CPC ........................ G06F 13/4022; H04L 49/101
USPC ........................................................ 710/317
See application file for complete search history.

(56) References Cited

U.S. PATENT DOCUMENTS

| | | |
|---|---|---|
| 6,327,651 B1 | 12/2001 | Dubey et al. |
| 7,933,405 B2 | 4/2011 | Knowles et al. |
| 8,010,953 B2 | 8/2011 | Gschwind |
| 2008/0065863 A1 | 3/2008 | Eichenberger et al. |
| 2010/0318771 A1 | 12/2010 | Sudhakar et al. |
| 2011/0040821 A1 | 2/2011 | Eichenberger et al. |

(Continued)

OTHER PUBLICATIONS

Datta et al. "Design of Shifting and Permutation Units using LSDL Circuit Family," Fortieth Asilomar Conference on Signals, Systems and Computers, 2006. ACSSC '06., pp. 1692-1696, Oct. 29, 2006-Nov. 1, 2006. doi: 10.1109/ACSSC.2006.355049.

(Continued)

*Primary Examiner* — Glenn A Auve
(74) *Attorney, Agent, or Firm* — Alexa L. Ashworth; Noah A. Sharkan (57) ABSTRACT

Exemplary embodiments of the present invention disclose a method and system for executing data permute and data shift instructions. In a step, an exemplary embodiment encodes a control index value using the recoding logic into a 1-hot-of-n control for at least one of a plurality of datum positions in the one or more target registers. In another step, an exemplary embodiment conditions the 1-hot-of-n control by a gate-free logic configured for at least one of the plurality of datum positions in the one or more target registers for each of the data permute instructions and the at least one data shift instruction. In another step, an exemplary embodiment selects the 1-hot-of-n control or the conditioned 1-hot-of-n control based on a current instruction mode. In another step, an exemplary embodiment transforms the selected 1-hot-of-n control into a format applicable for the crossbar switch.

7 Claims, 5 Drawing Sheets

(56) References Cited

U.S. PATENT DOCUMENTS

2011/0040822 A1  2/2011  Eichenberger et al.
2014/0129809 A1* 5/2014  Kaltenbach et al. .......... 712/226

OTHER PUBLICATIONS

Hsu et al. "A 280mV-to-1.1V 256b reconfigurable SIMD vector permutation engine with 2-dimensional shuffle in 22nm CMOS," 2012 IEEE International Solid-State Circuits Conference Digest of Technical Papers (ISSCC), pp. 178-180, Feb. 19-23, 2012. doi: 10.1109/ISSCC.2012.6176966.

Sinharoy et al. "IBM POWER7 Multicore Server Processor," IBM J. Res. & Dev., vol. 55, No. 3, Paper 1, May/Jun. 2011, © 2011 IBM.

Wikipedia, the Free Encyclopedia, "PowerPC 970," page was last modified on Jul. 21, 2012, Wikipedia® is a registered trademark of the Wikimedia Foundation, Inc. <http://en.wikipedia.org/wiki/PowerPC_970>.

* cited by examiner

BYTE SELECTION AND STEERING LOGIC FOR COMBINED BYTE SHIFT AND BYTE PERMUTE VECTOR UNIT

FIELD OF THE INVENTION

The present invention relates generally to computer processor microarchitecture and more specifically to the implementation of byte shift and byte permute instruction operations in a general purpose execution.

BACKGROUND OF THE INVENTION

Multimedia and cryptographic applications are increasingly ubiquitous, driving an increased demand for efficient facilities within processors that execute special instructions to enhance their execution. In particular, the ability to quickly rearrange the position of bytes in a general way or to shift them left or right enhances the execution of many of these applications. These operations are often performed by permute and shift instructions respectively. Most instructions supported by a typical multimedia facility within a processor architecture require specialized hardware to decrease their execution time.

Shift operations are often performed utilizing a barrel shifter. However, this approach consumes increased area as the shifts become wider. The ability to perform wide shifts (64 to 128 bits), useful in performing multimedia operations, is very expensive in hardware implementations. The area needed for a barrel shifter performing wide shifts, and the latency incurred by such a shifter, may become significant. Increased area leads to increased energy consumption and increased cost due to lower chip yields and increased cooling requirements.

Permute operations are often performed by executing a sequence of instructions or, more efficiently, in a unit incorporating a crossbar switch that can execute a special permute instruction. A crossbar switch can reorder an arrangement of bytes into a different arrangement and is useful in many applications, especially multimedia and cryptographic applications.

SUMMARY

Exemplary embodiments of the present invention disclose a method and system for executing data permute and data shift instructions, also called vector instructions, with improved control logic that includes a shared crossbar switch and gate-free source byte selection and steering logic. In a step, an exemplary embodiment encodes a control index value using the recoding logic into a 1-hot-of-n control for at least one of a plurality of datum positions in the one or more target registers. In another step, an exemplary embodiment conditions the 1-hot-of-n control by a gate-free logic configured for at least one of the plurality of datum positions in the one or more target registers for each of the data permute instructions and the at least one data shift instruction. In another step, an exemplary embodiment selects the 1-hot-of-n control or the conditioned 1-hot-of-n control based on a current instruction mode. In another step, an exemplary embodiment transforms the selected 1-hot-of-n control into a format applicable for the crossbar switch.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products (not shown) according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Modern processors often include a special processing unit structured to efficiently store and manipulate long arrays of bits, performing manipulations on the arrays that are advantageous during the execution of many scientific, multimedia, and cryptographic applications. The special processing units are often called multimedia units, vector units, or Single Instruction Multiple Data (SIMD) units.

Long arrays of bits, called vectors, are stored in vector registers, and are manipulated by the execution of vector instructions, also called instructions. Although the application hereto refers to the use of vector instructions, other forms of instructions may be used in exemplary embodiments of the present invention. Arrays of bits are subdivided into shorter arrays having 8-bits called bytes. The arrays of bits are subdivided into arrays of bytes to facilitate handling arrays and sections of arrays in hardware and to facilitate using the arrays to efficiently represent values and patterns. The special processing units incorporate wide data paths and register files to provide for the movement and storage of vectors and have arithmetic and logic units (ALUs) that may operate on a plurality of bytes in vectors individually and concurrently.

Figure 1:
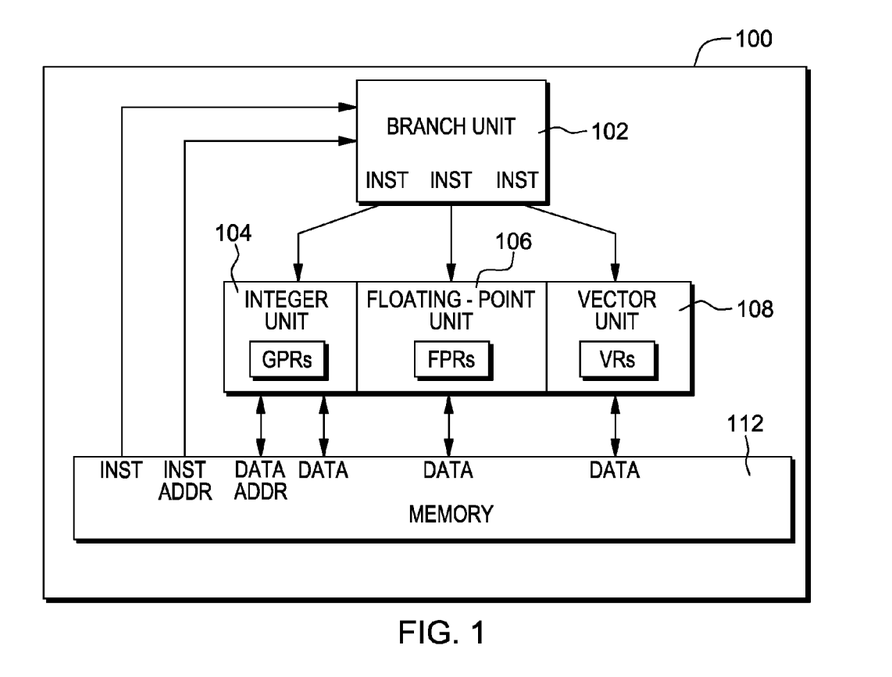
FIG. 1 is a block diagram of a microprocessor that shows primary functional units.

FIG. 1 depicts a modern processor 100 including a branch unit 102, an integer unit 104, a floating point unit 106, a vector unit 108, and a memory 112. Branch unit 102 in processor 100 fetches instructions from memory 112 and issues instructions to appropriate functional units to execute the instructions. The cycle during which an instruction is issued and the functional unit to which the instruction is issued, depends on the type of instruction, the availability of resources in the processor and on dependencies the instruction may have on previously issued but not yet executed instructions. During execution, an instruction reads data from one or more registers or memory, operates on the data, and stores a result in one or more registers or in memory. Vector unit 200 depicted in FIG. 2, reads data from vector register file 202, operates on the data in vector instruction execution unit 204 and stores a result back into the vector register file.

Figure 2:
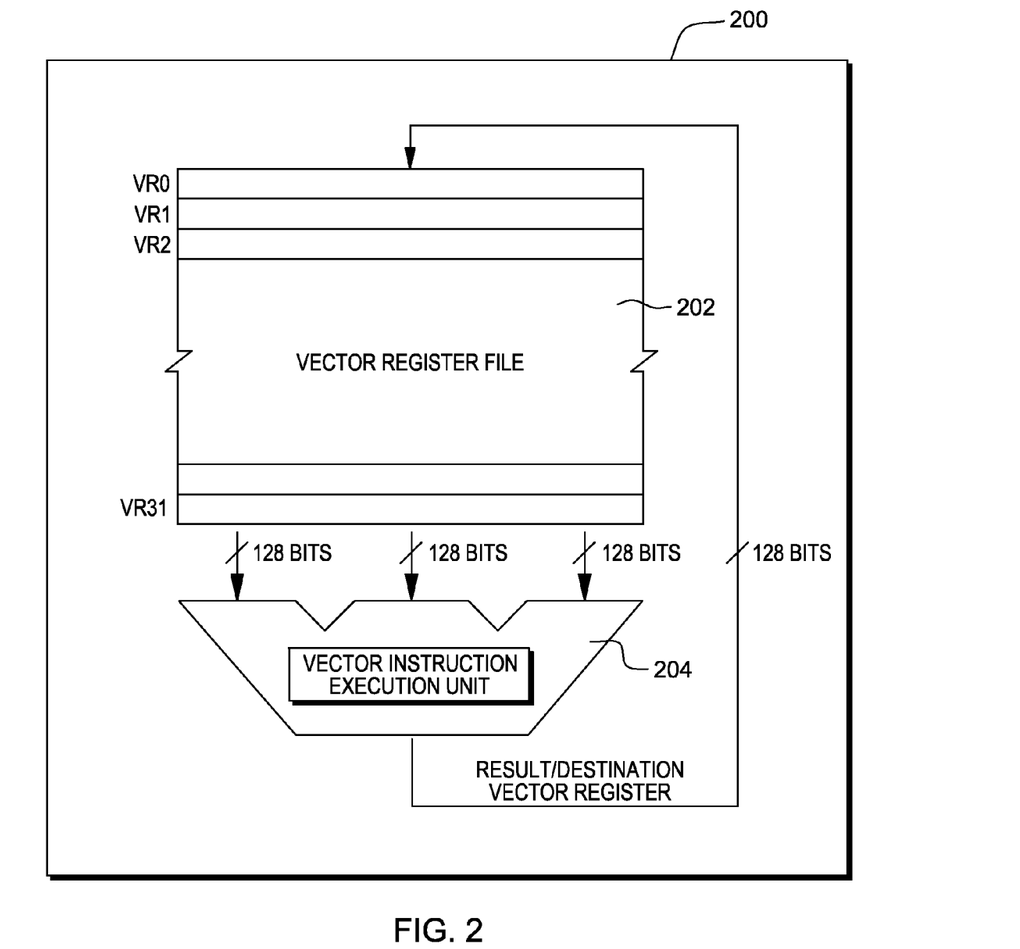
FIG. 2 shows a vector unit depicted in FIG. 1 in more detail.

The architectures depicted in FIG. 1 and FIG. 2 are provided solely for the purpose of illustrating and explaining exemplary embodiments of the present invention and are not meant to imply any architectural limitations. Those skilled in the art will recognize that many variations are possible. Processor 100 may include, for example, multiple integer and floating point execution units to increase processing throughput. All such variations are within the spirit and scope of the present invention.

A vector instruction contains information specifying the type of operation to be performed, called the op code, the one or more vector registers containing the vectors to be operated on, called the source registers, and one or more vector registers, called the target registers, containing the result of the completed operation. A vector instruction may specify additional registers containing information to control or influence the execution of the vector instruction. All registers involved in the execution of the vector instruction are explicitly specified in the instruction or are implicitly specified by the op code of the instruction.

A type of vector manipulation extremely useful in many applications is the rearrangement of the bytes in a vector either by shifting the bytes left or right while maintaining the relative order of the bytes or by performing a more general rearrangement that may not maintain the relative order of the bytes. An execution of a vector shift instruction shifts bytes in a source register while maintaining the relative order of the bytes in the source register, and the execution of a vector permute instruction performs a general rearrangement of the bytes in a source register and may not maintain the relative order of the bytes in the source register.

Figure 3:
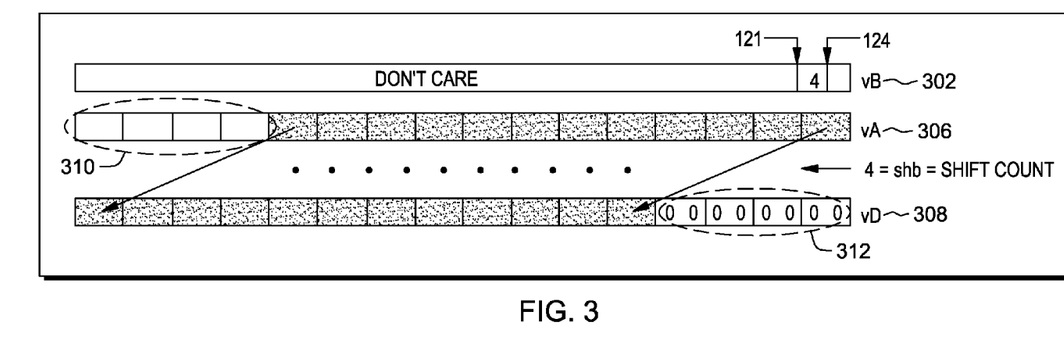
FIG. 3 depicts the execution of a byte shift-left vector instruction operation.

FIG. 3 depicts an example of the operation of a byte shift-left vector instruction which contains information specifying control register 302, source register 306, and target register 308. In the vector operation depicted in FIG. 3, a copy of the bytes in source register 306 are shifted left by the number of bytes expressed in the 4-bit field in control register 302 including bits in positions 121, 122, 123, and 124 (bit positions 122 and 123 are not shown). The result of the byte shift-left vector instruction is stored in target register 308. In the vector operation depicted in FIG. 3, bytes 310 are left-shifted out of a copy of source register 306 and are discarded while bytes that are composed of zeros 312 are left-shifted into the copy of source register from the right end of the source register 306 to replace byte positions vacated by the shift. The operation of a byte shift-left and rotate vector instruction is similar to the operation of a byte shift-left vector instruction depicted in FIG. 3, with the provision that bytes that are shifted out one end of a copy of a source register are shifted back into the other end of the copy of source register. Thus the bytes in a copy of source register are rotated left, for a byte shift-left and rotate instruction, and are rotated right, for a byte shift-right and rotate vector instruction, with no bytes being discarded.

Figure 4:
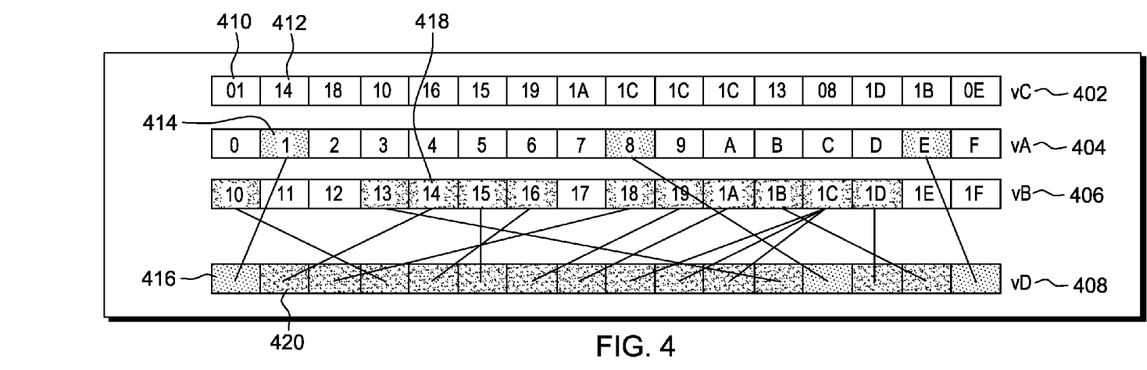
FIG. 4 depicts the execution of a byte permute vector instruction operation.

FIG. 4 depicts an example of a byte permute vector instruction operation. In the vector permute operation depicted in FIG. 4, byte arrays in source registers 404 and 406 are logically concatenated to generate a source-array including source registers positioned end-to-end with source register 404 on the left and source register 406 on the right. Byte positions in the source-array are indexed starting at 0 for the left-most byte position of source register 404 and ending at 31 for the right-most byte position in source register 406. The value of a byte in a byte position n in control register 402 specifies the index of a byte in the source-array that is to be copied into the corresponding byte position n in target register 408.

In FIG. 4, the value in byte position 0 (shown as 410), of control register 402 is 0x01, a hexadecimal number that is 1 in decimal. The value in byte position 0 of control register 402 specifies which byte in the source-array is copied to position 0 of target register 408. A value of 1 in byte position 0 of control register 402 specifies that the value in byte position 1 (shown as 414), of the source-array is copied to byte position 0 (shown as 416) in target register 408.

Similarly in FIG. 4, the value in byte position 1 (shown as 412) of control register 402 is 0x14, a hexadecimal number that is 20 in decimal. The value in byte position 1 of control register 402 specifies which byte in the source-array is copied to position 1 of target register 408. A value of 20 in byte position 1 of control register 402 specifies that the value in byte position 20 (shown as 418) of the source-array is copied to byte position 1 (shown as 420) in target register 408.

Figure 5:
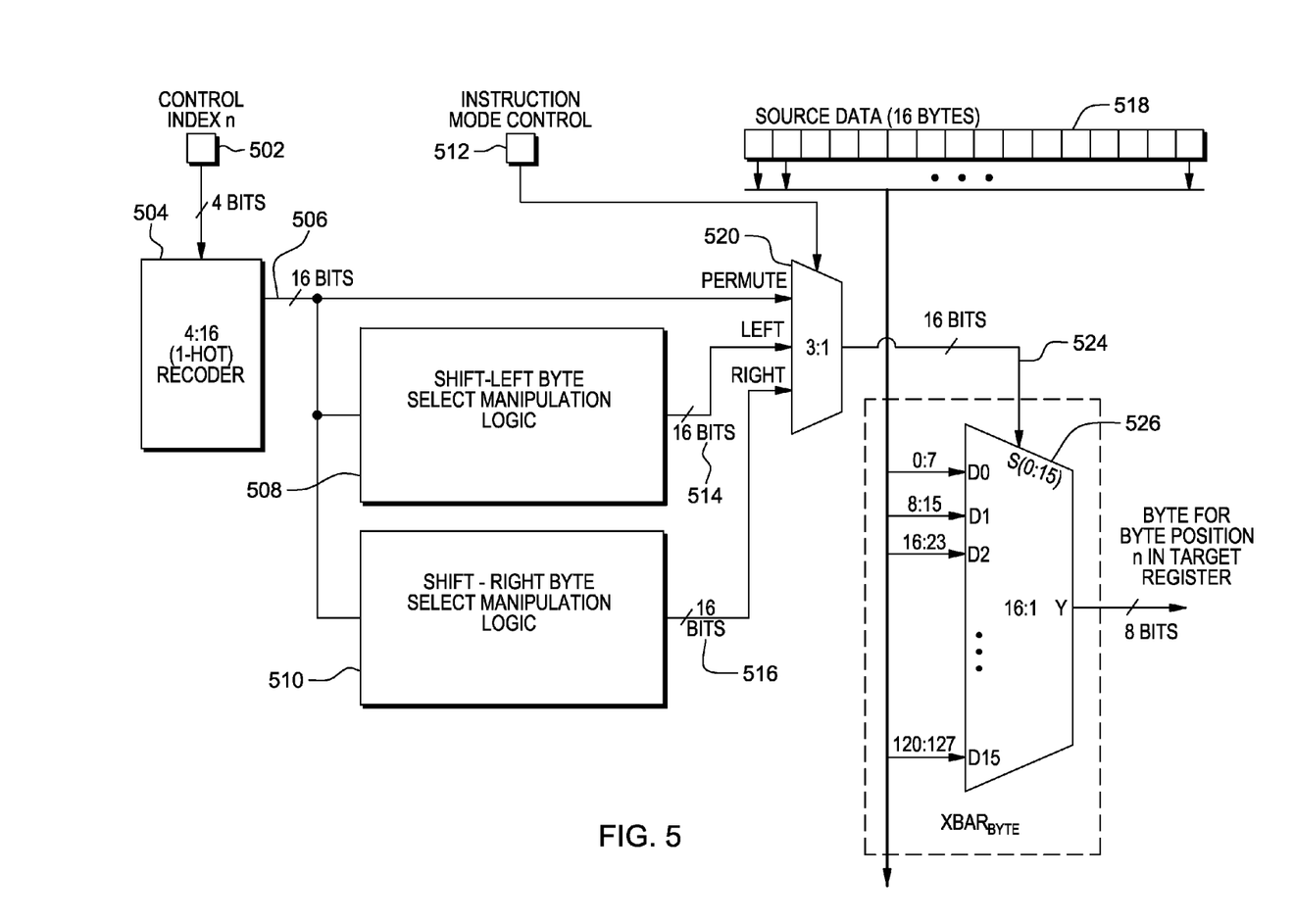
FIG. 5 is a block diagram of logic employing 1-hot selects and gate-free logic to rearrange bytes as specified during the execution of byte shift-left, byte shift-right, and byte permute vector instructions.

In an exemplary embodiment, the logic depicted in FIG. 5, decodes byte shift-left and rotate, byte shift-right and rotate, and byte permute instructions into a source register byte select for each byte position in a target register. The logic in FIG. 5 selects a source byte and steers the source byte to a predetermined, hardwired, position in a selected target register during the execution of a byte shift-left and rotate vector instruction, a byte shift-right and rotate vector instruction or a byte permute vector instruction. The logic in FIG. 5 therefore combines and reduces the amount of logic necessary in a processor for the operations and quickens instruction executions. The logic in FIG. 5 is for one predetermined byte position. A specific target resister is not predetermined in the logic in FIG. 5, only a particular byte position is predetermined. Thus, the logic in FIG. 5 is replicated with a minor alteration for each byte position in a target register so that all the bytes in a target register may be replaced by selected bytes from selected source registers in a single operation.

FIG. 5 depicts logic to select a byte for position n in a target register. Control index 502 originates in control index bit-field n in a vector permute instruction and originates in a shift value field in a byte shift and rotate instruction, depending on the type of instruction executed. In this embodiment, control index 502 is a 4-bit quantity. If control index 502 originates in a byte permute vector instruction, control index specifies a position in a source register that contains a byte to be copied to byte position n in a specified target register. If control index 502 originates in a byte shift and rotate vector instruction, control index specifies the number of byte positions an array of bytes is to be shifted and rotated. Regardless of the source of control index 502, the value of control index is converted by recoder 504 into 1-hot recoder output 506. In this embodiment, recoder output 506 is 1-hot-of-16 bits because control index 502 is 4-bit in this embodiment. Recoder output 506 includes one bit for each of the 16 possible source byte positions in source register 518.

The logic in FIG. 5 conditions 1-hot-of-16 bits recoder output 506 three ways concurrently, one way each for byte permute, byte shift-right and rotate, and byte shift-left and rotate instructions in advance of determining which select is used. The time taken for recoder output 506 conditioning is effectively hidden because the conditioning is concurrent with the access of source bytes and setup time on byte selection logic, thus shortening total instruction execution time and consolidating logic.

In the event that a byte shift and rotate vector instruction is executed, control index 502 is a shift value originating in the instruction and recoder output 506 is a 1-hot recoding of control index. Shift-left byte select manipulation logic 508 conditions recoder output 506 to select a byte in a source register for the event in which the instruction executed is a byte shift-left and rotate vector instruction and shift-right byte select manipulation logic 510 conditions recoder output to select a byte in a source register for the event in which the instruction executed is a byte shift-right and rotate vector instruction. Recoder output 506 remains unchanged for the event in which the instruction under execution is a byte permute instruction, because recoder output already specifies a byte in a source register copied to byte position n in a target register and needs no further conditioning.

In exemplary embodiments, neither shift-left byte select manipulation logic 508 nor shift-right byte select manipulation logic 510 employ logic gates and are therefore gate-free. Thus, the conditioning of recoder output 506 by shift-left byte select manipulation logic 508 and shift-right byte select manipulation logic 510 is extremely fast and consumes nearly no energy or die area. In exemplary embodiments, both shift-left byte select manipulation logic 508 and shift-right byte select manipulation logic 510 are designed for a specific target register byte position and have a unique configuration for each byte position in a target register.

The 1-hot-of-16 output 516 is the output of shift-right byte select manipulation logic 510 that selects one of 16 source bytes to be copied to position n in a target register if a byte shift-right and rotate instruction is currently under execution. The 1-hot-of-16 output 514 is the output of shift-left byte select manipulation logic 508 that selects one of 16 source bytes to be copied to position n in a target register if a byte shift-left and rotate instruction is currently under execution. Instruction mode control 512 causes multiplexer 520 to select one of three inputs, 506, 514, or 516, as an output based on the type of instruction type currently under execution, byte permute, byte shift-left and rotate, or byte shift-right and rotate, respectively.

The output 524 of multiplexer 520 controls crossbar switch 526, capable of steering any one of the 16 source register byte inputs to the crossbar switch, to position n in a target register.

Figure 6:
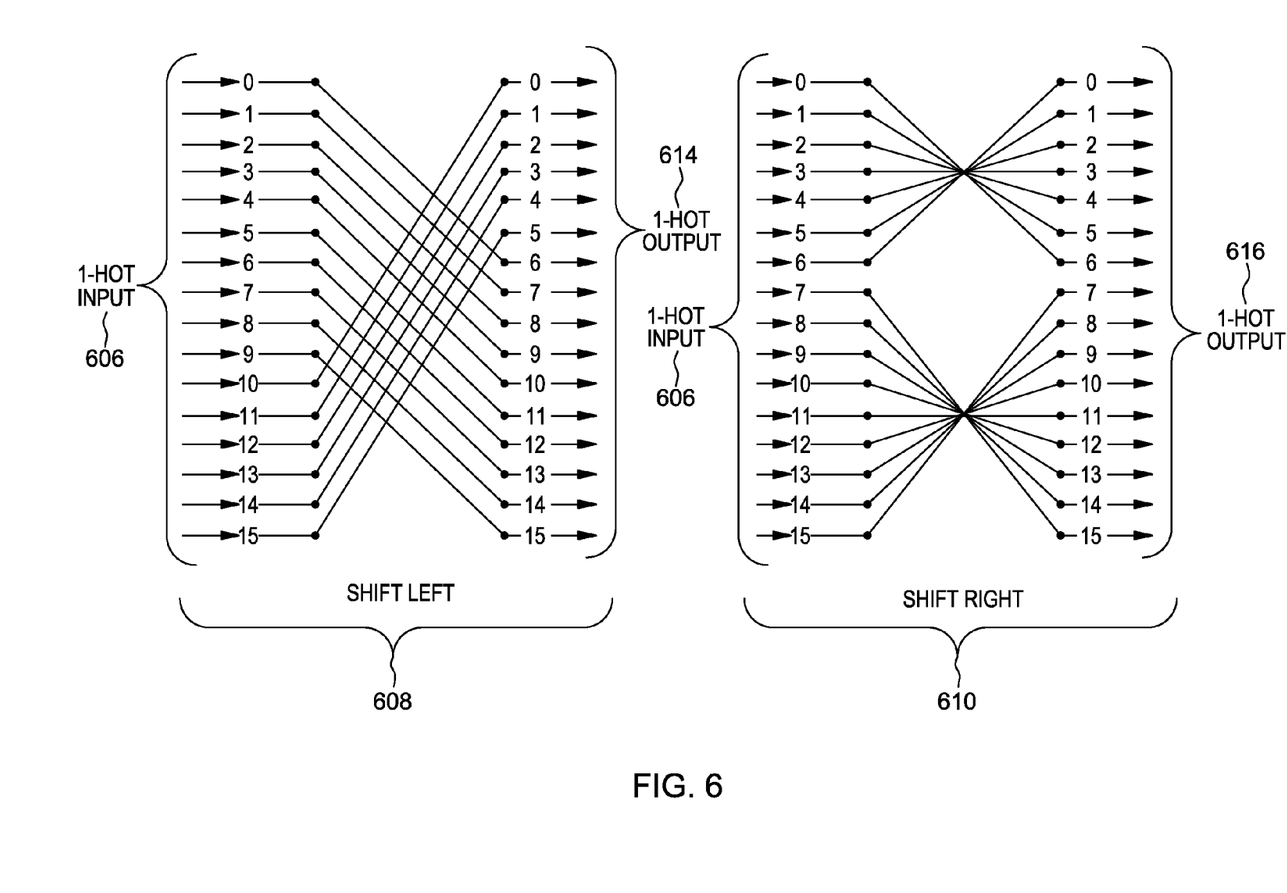
FIG. 6 shows the detail of the gate-free source byte selection logic for target byte 6 for byte shift-left and byte shift-right vector instructions.

FIG. 6 illustrates an aspect of exemplary embodiments of the present invention. In the case that the logic in FIG. 5 steers a byte to target register byte position 6, input/output connection diagrams 608 and 610 in FIG. 6 depict the internal structure of logic blocks 508 and 510 in FIG. 5 respectively. 1-hot input 606 in FIG. 6 is the 1-hot select 506 shown in FIG. 5, and 1-hot outputs 614 and 616 in FIG. 6 are the outputs 514 and 516 shown in FIG. 5 respectively. Signal line routing for gate-free logic 610 is tabulated in Table 1. The manipulation of signal lines in logic blocks 508 and 510 specific to target register byte positions other than target register byte position 6 is also gate-free signal rerouting. Therefore logic blocks 508 and 510 perform simple, gate-free, energy-free, and area-free signal rerouting and enhance the efficiency of exemplary embodiments of the present invention.

TABLE 1

Byte shift-right and rotate gate-free logic for target register byte position 6. Input-to-output signal routing of gate-free logic in FIG. 6, for target register byte position 6

| right shift amount | position of source byte selected | 1-hot-of-16 recoding of shift amount (input 506 in FIG. 5 and input 606 in FIG. 6) | 1-hot-of-16 encoding of source byte select (output 516 in FIG. 5 and output 616 in FIG. 6) |
|---|---|---|---|
| 0 | 6 | 1000000000000000 | 0000001000000000 |
| 1 | 5 | 0100000000000000 | 0000010000000000 |
| 2 | 4 | 0010000000000000 | 0000100000000000 |
| 3 | 3 | 0001000000000000 | 0001000000000000 |
| 4 | 2 | 0000100000000000 | 0010000000000000 |
| 5 | 1 | 0000010000000000 | 0100000000000000 |
| 6 | 0 | 0000001000000000 | 1000000000000000 |
| 7 | 15 | 0000000100000000 | 0000000000000001 |
| 8 | 14 | 0000000010000000 | 0000000000000010 |
| 9 | 13 | 0000000001000000 | 0000000000000100 |
| 10 | 12 | 0000000000100000 | 0000000000001000 |
| 11 | 11 | 0000000000010000 | 0000000000010000 |
| 12 | 10 | 0000000000001000 | 0000000000100000 |
| 13 | 9 | 0000000000000100 | 0000000001000000 |
| 14 | 8 | 0000000000000010 | 0000000010000000 |
| 15 | 7 | 0000000000000001 | 0000000100000000 |

The forgoing description is an example embodiment only, and those skilled in the art understand that the number of bytes in one or more source and one or more target registers is immaterial to developing 1-hot selects and gate-free byte steering logic in consolidated multiple instruction type shifting and permute executions to achieve fast, low energy, and low area consuming implementations. For example, the same efficiency can be achieved by applying exemplary embodiments described herein to byte shift without rotate and bit shift instructions as well.

What is claimed is:

1. A system for executing data permute instructions and at least one data shift instruction, the system comprising:
    one or more source registers;
    one or more target registers each target register having a plurality of datum positions;
    a crossbar switch having an output for at least one datum position in the one or more target registers;
    recoding logic adapted to control the crossbar switch;
    wherein the system is operable to:
        encode a control index value using the recoding logic into a 1-hot recoder output for at least one of the plurality of datum positions in the one or more target registers;
        condition the 1-hot recoder output by a gate-free logic configured for at least one of the plurality of datum positions in the one or more target registers for each of the data permute instructions and the at least one data shift instruction;
        select the 1-hot recoder logic or the conditioned 1-hot recoder logic based on a current instruction mode; and
        transform the selected 1-hot-of-n control into a format applicable for the crossbar switch.

2. The system of claim 1, wherein the control index value is a datum rotate amount in a datum shift-right and rotate instruction.

3. The system of claim 1, wherein the control index value is a datum rotate amount in a datum shift-left and rotate instruction.

4. The system of claim 1, wherein the control index value is a permute instruction control to specify a datum position in the one or more source registers.

5. The system of claim 1, wherein a datum shift-left instruction specifies that zeros are shifted into at least one of the plurality of datum positions in the one or more target registers from the right.

6. The system of claim 1, wherein a datum shift-right instruction specifies that zeros are shifted into at least one of the plurality of datum positions in the one or more target registers from the left.

7. The system of claim 1, wherein the one or more source registers are partitioned into one or more arrays of source datum positions mapped to one or more arrays of target datum positions in the one or more target registers, and the data permute instructions and at least one data shift instruction are adapted to perform the same operation on each array of source datum positions writing one or more results to a corresponding array of target datum positions.

* * * * *